US007753001B2

United States Patent
Hung

(10) Patent No.: US 7,753,001 B2
(45) Date of Patent: Jul. 13, 2010

(54) BARRIER FOR POULTRY TROUGH

(76) Inventor: Shu-Hui Hung, No. 57-1, Houlong St., West Dist., Taichung (TW)

( * ) Notice: Subject to any disclaimer, the term of this patent is extended or adjusted under 35 U.S.C. 154(b) by 237 days.

(21) Appl. No.: 11/979,282

(22) Filed: Nov. 1, 2007

(65) Prior Publication Data
US 2009/0114160 A1 May 7, 2009

(51) Int. Cl.
A01K 39/014 (2006.01)
(52) U.S. Cl. .................... 119/63; 119/61.3
(58) Field of Classification Search ............. 119/63, 119/61.1, 52.1, 58–60, 61.3, 51.01, 61.4
See application file for complete search history.

(56) References Cited

U.S. PATENT DOCUMENTS

| 1,067,377 | A | * | 7/1913 | Schisler | 119/61.3 |
|---|---|---|---|---|---|
| 1,187,307 | A | * | 6/1916 | Grossman | 119/63 |
| 1,462,751 | A | * | 7/1923 | Huntington | 119/61.3 |
| 1,810,230 | A | * | 6/1931 | Thumann | 119/52.1 |
| 1,810,782 | A | * | 6/1931 | Morris | 119/63 |
| 1,847,351 | A | * | 3/1932 | McCaughey | 119/61.3 |
| 1,881,023 | A | * | 10/1932 | Hoeft | 119/61.3 |
| 1,920,536 | A | * | 8/1933 | Vahlkamp | 119/52.1 |
| 2,737,152 | A | * | 3/1956 | Du Rall | 119/52.1 |
| 2,783,739 | A | * | 3/1957 | Nicklas | 119/52.1 |

* cited by examiner

Primary Examiner—Rob Swiatek
Assistant Examiner—Kristen C Hayes
(74) Attorney, Agent, or Firm—WPAT, PC; Justin King

(57) ABSTRACT

A barrier for poultry troughs has a ridge bracket, two shutters and a holding device. The ridge bracket has two surfaces, a mounting edge and a connecting edge. The shutters are respectively mounted on the surfaces of the ridge bracket. The holding device is connected securely to the ridge bracket to allow the barrier to be raised and lowered over the poultry trough to prevent poultry from feeding from the trough whilst the troughs are being filled. Once filed the holding device is used to raise the barrier and expose feed to the poultry. When the barrier is lowered, the pivoting of the shutters prevents damage to poultry straddling the trough and automatically closes once the poultry have left the trough.

8 Claims, 5 Drawing Sheets

BARRIER FOR POULTRY TROUGH

BACKGROUND OF THE INVENTION

1. Field of the Invention

The present invention relates to a barrier, and more particularly relates to a barrier for poultry troughs, which prevents poultry eating feed whilst the feed being distributed throughout poultry troughs.

2. Description of Related Art

A conventional feeding system for poultry comprises at least one trough, a hopper and at least one conveyor and is implemented with poultry feed. Each trough is an open container disposed as a loop having a beginning and an end and has a top and a chamber. The hopper is mounted on the top of the trough at between the beginning and end of the loop and has a bottom and an opening. The opening is defined in the bottom of the hopper and communicates with the chamber of the trough. The conveyor is movably mounted in and moves through the chamber, from the beginning to the end of the trough and has multiple compartments. When a user fills the hopper with feed, the feed flows evenly into the chamber of the trough through the opening and sequentially fills the compartment of the conveyor as the compartments move under the trough allowing the conveyor to distribute the feed throughout the chamber of the trough.

However, poultry at the beginning of the trough are able to consume the feed immediately whilst poultry further along the trough are able to consume feed for proportionally less time and are exposed to less feed. Therefore, the feed is not distributed evenly causing poultry closest to the hopper to be over-fed and fat, whilst poultry far away from the hopper are underfed and thin.

To overcome the shortcomings, the present invention provides a barrier for poultry troughs to mitigate or obviate the aforementioned problems.

SUMMARY OF THE INVENTION

The main objective of the present invention is to provide a barrier for poultry troughs, which prevents poultry eating feed whilst the feed is being distributed throughout the poultry troughs.

The barrier for poultry trough in accordance with the present invention has a ridge bracket, two shutters and a holding device. The ridge bracket has two surfaces, a mounting edge and a connecting edge. The shutters are respectively mounted on the surfaces of the ridge bracket. The holding device is connected securely to the ridge bracket to allow the barrier to be raised and lowered over the poultry trough to prevent poultry from feeding from the trough whilst the troughs are being filled. Once filed the holding device is used to raise the barrier and expose feed to the poultry. When the barrier is lowered, the pivoting of the shutters prevents damage to poultry straddling the trough and automatically closes once the poultry have left the trough.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
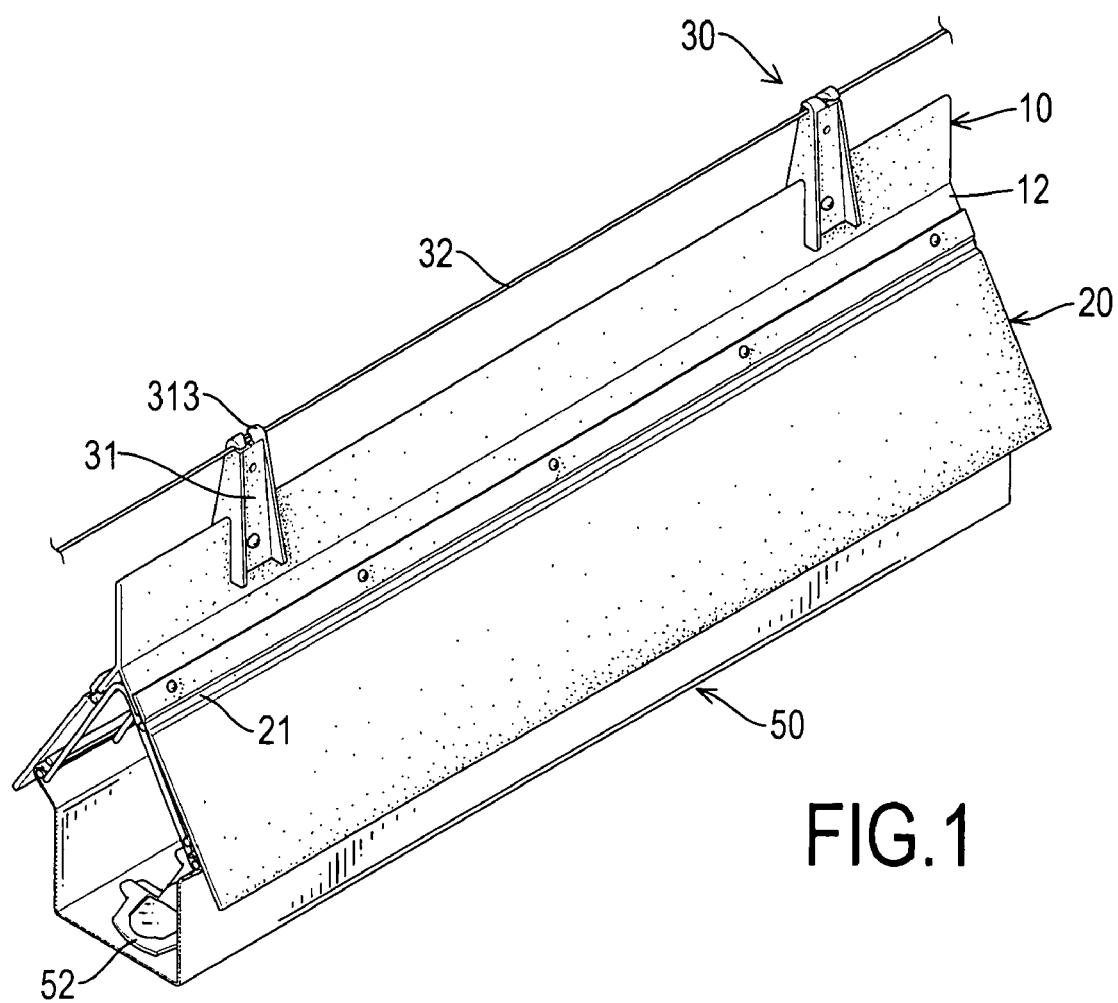
FIG. 1 is a perspective view of a barrier in accordance with the present invention, shown mounted on a poultry trough.
Figure 2:
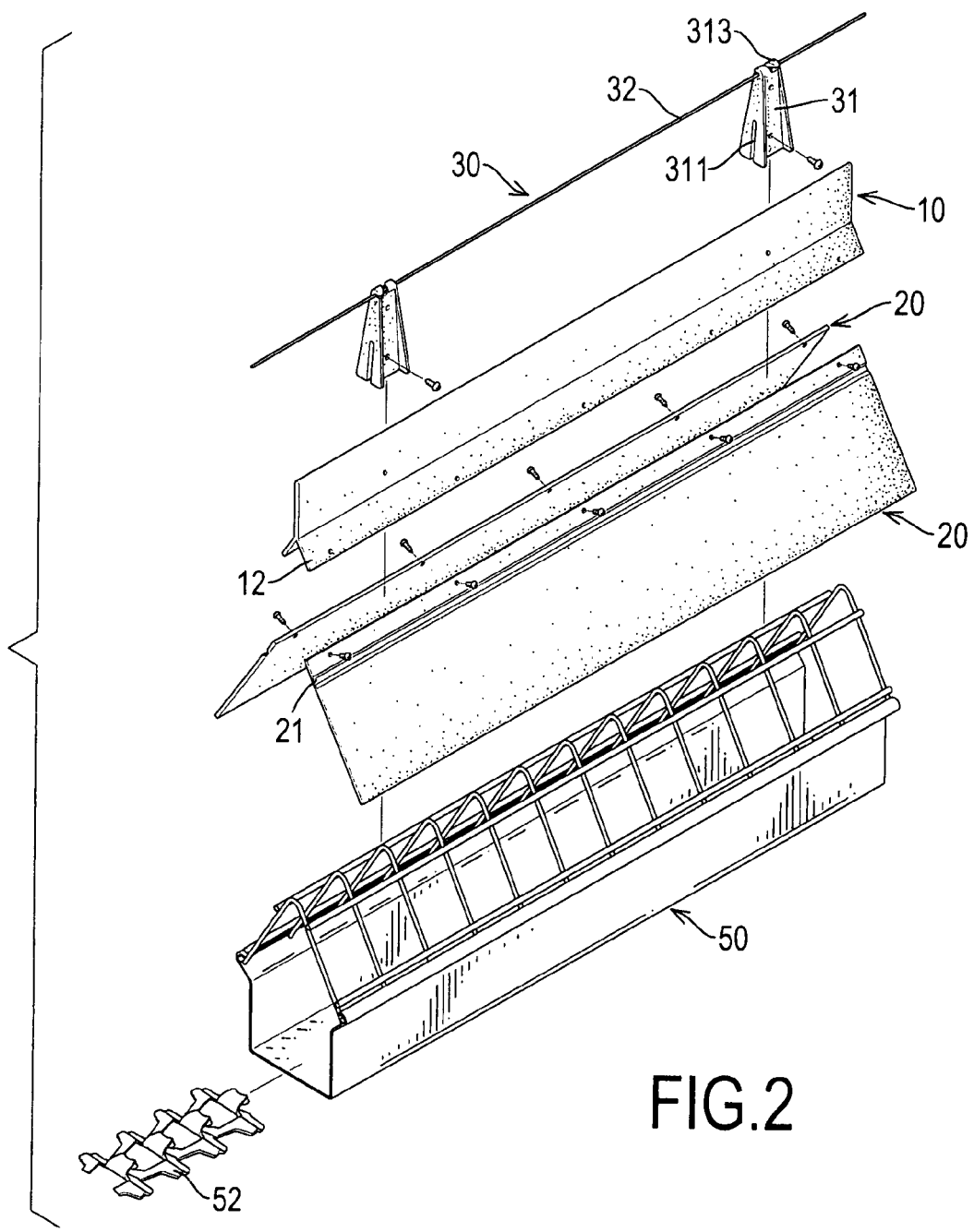
FIG. 2 is an exploded view of the barrier in FIG. 1.
Figure 3:
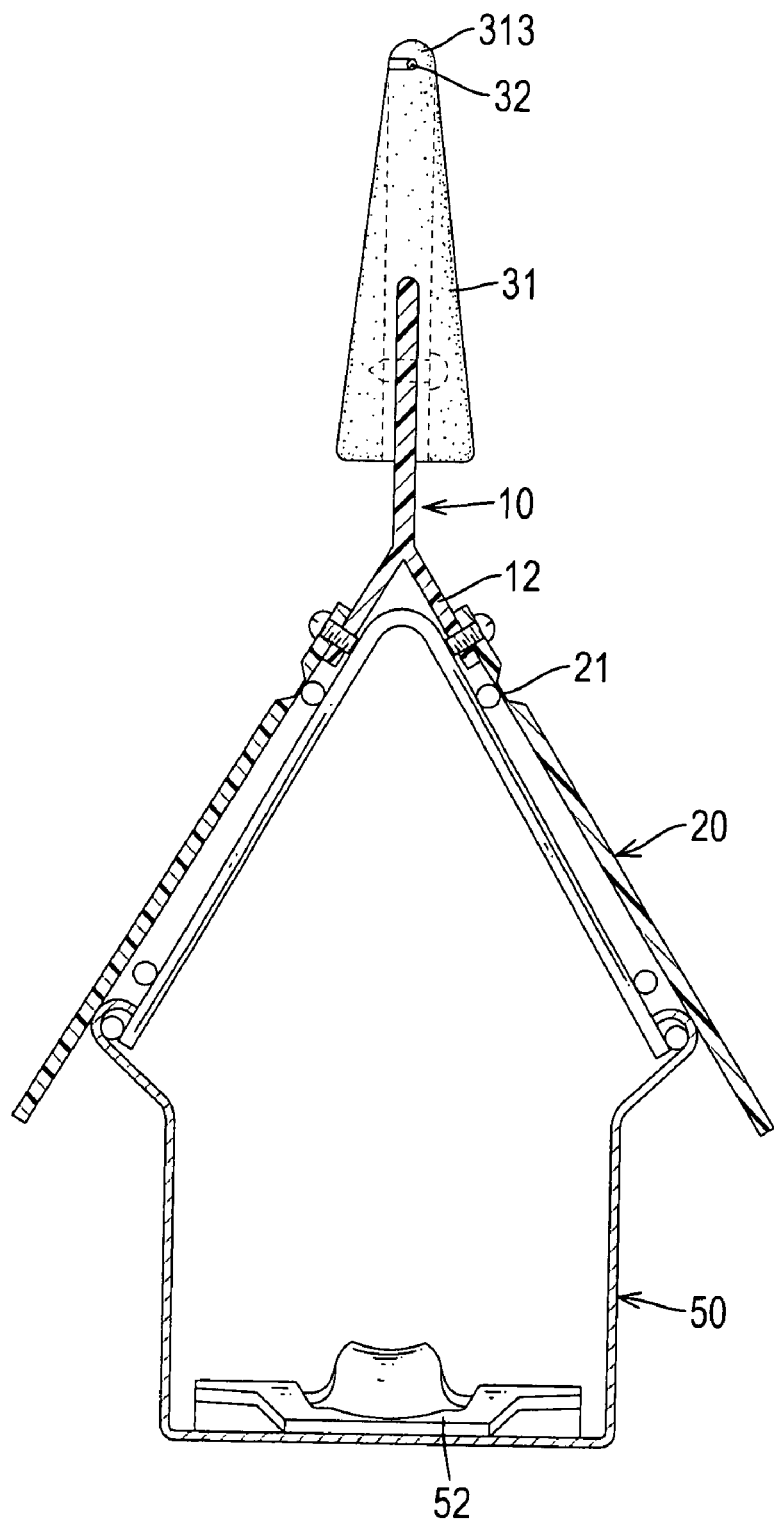
FIG. 3 is a side view in partial section of the barrier in FIG. 1.

With reference to FIGS. 1 to 3, a barrier for poultry troughs (50) having a top and a conveyor (52) in accordance with the present invention comprises a ridge bracket (10), two shutters (20) and a holding device (30).

The ridge bracket (10) may be Y-shaped and have to optional lower panels (12), a mounting edge, a connecting edge and two surfaces. The lower panels (12) are respectively form on and perjury at an angle from both surfaces of the ridge bracket (10) at the connecting edge and each has an internal surface and an external surface.

The shutters (20) are respectively mounted on the surfaces of the ridge bracket (10) at the connecting edge, may be mounted on the external surfaces of the lower panels (12), may be mounted securely and each shutter (20) has a proximal edge, an external surface and an optional crease (21). The proximal edges of the shutters (20) are mounted on the surfaces of the ridge bracket (10), maybe on the lower panels (12). The crease (21) is formed longitudinally on the external surface of the shutters (20) near the proximal edge and allow the shutters (20) to fold toward the ridge bracket (10).

The holding device (30) is connected securely to the ridge bracket (10) and may comprise multiple hangers (31) and a cord (32). Each hanger (31) may be triangular, is connected securely to the ridge bracket (10) and each hanger (31) has a top end, a bottom end and may comprise an inserting recess (311) and at least one hook (313). The bottom end of the hanger (31) is mounted securely on mounting edge of the ridge bracket (10). The inserting recess (311) is formed in the bottom end of each hanger (31) and is mounted around the mounting edge of the ridge bracket (10). Each hook (313) is formed on the top end of the hanger (31). The holding cord (32) is mounted through the hangers (31), is parallel to the ridge bracket (10) and may be mounted through the hooks (313) of the hangers (31).

Figure 4:
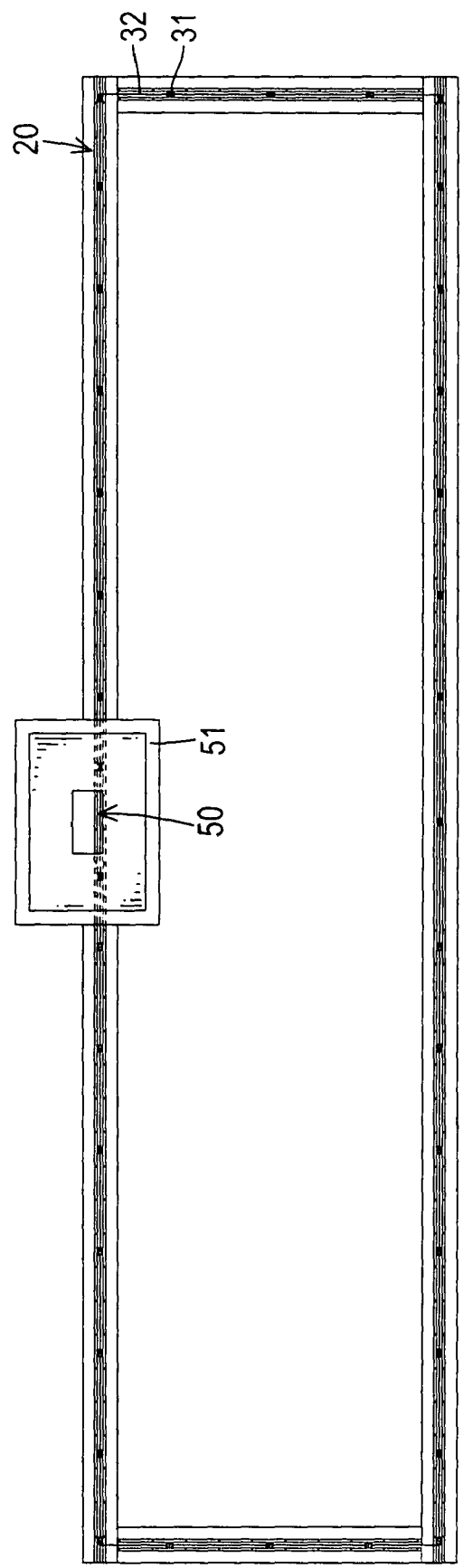
FIG. 4 is a top view of the barrier in FIG. 1, shown mounted over a looped poultry trough.

With further reference to FIG. 4, at least one barrier is mounted movably over a looped poultry trough (50). The shutters (20) of the barrier correspond to and cover the poultry trough (50). A motor winch or the like can be used to alternately raise and lower the holding device (30) to cover and uncover the poultry trough (50).

When the barrier covers the poultry trough, feed is distributed through the troughs using a conventional hopper (51) and the shutters (20) prevent poultry (60) from feeding during transportation of the feed. Therefore, the feed can be distributed evenly throughout the looped poultry trough (50). When the barrier is raised by the holding device (30) all the feed is simultaneously exposed to all the poultry (60) thereby, preventing over or under-feeding of poultry caused by their positioning.

Figure 5:
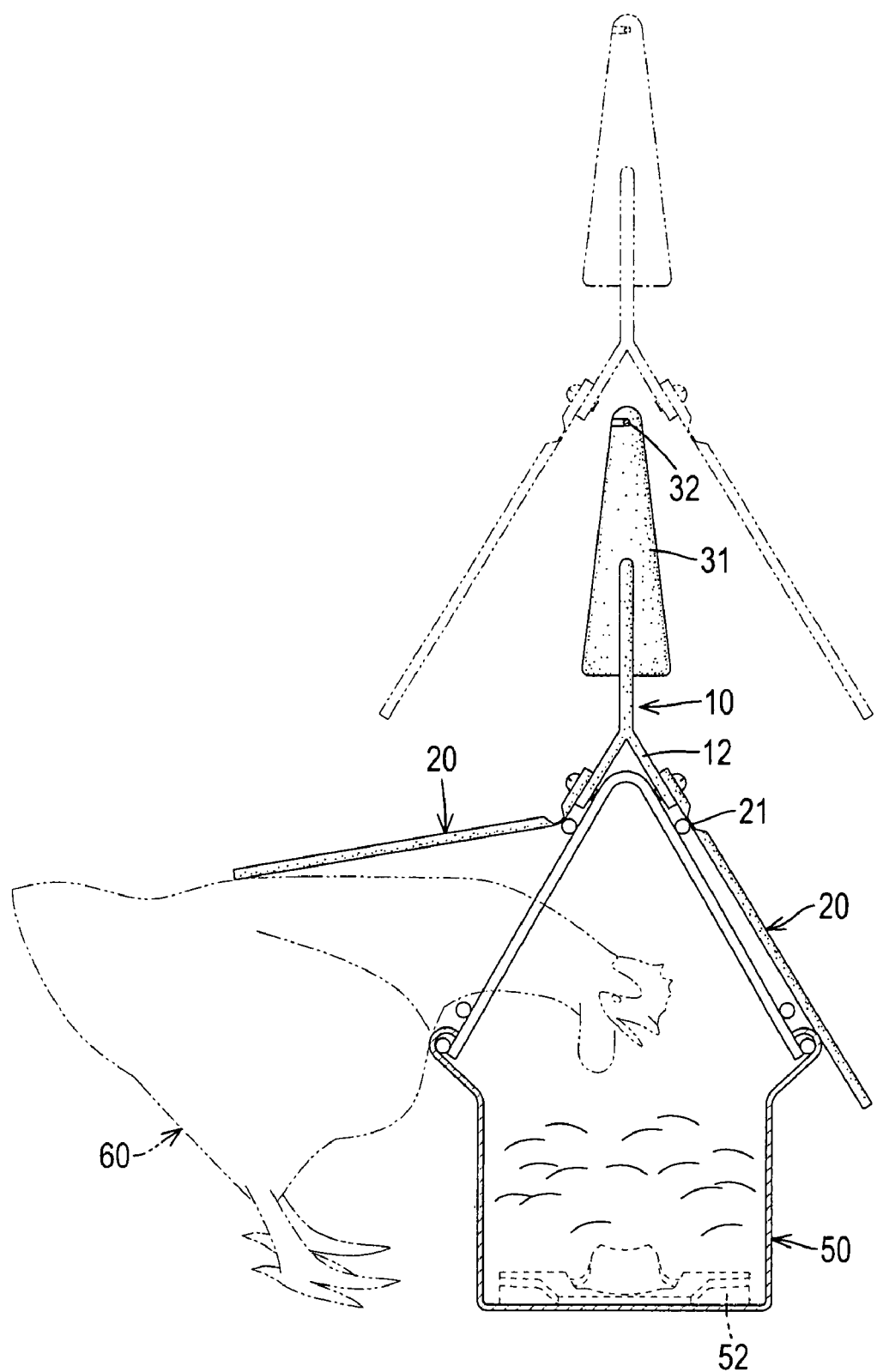
FIG. 5 is another operational side view of the barrier in FIG. 1, wherein an open position in shown in phantom lines and a chicken is feeding through a shutter.

Furthermore, with reference to FIG. 5, when a poultry (60) stands near the poultry trough (50) during the movement of the barrier down on the poultry trough (50), the crease (21) can cause the proximal edge of the shutter (20) slanting relative to the distal edge of the shutter (20) and this can prevent the poultry (60) getting hurt when the shutter (20) mounted on the poultry trough (50).

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A barrier for poultry troughs having:
   a ridge bracket having
      a mounting edge;
      a connecting edge;
      two surfaces; and
      two lower panels formed respectively on and protruding from the surfaces at the connecting edge of the ridge bracket and each lower panel having an internal surface and an external surface;
   two shutters respectively mounted on the external surfaces of the lower panels of the ridge bracket at the connecting edge and each shutter having
      a proximal edge being mounted on the external surface of a corresponding lower panel of the ridge bracket; and
      an external surface; and
   a holding device being connected securely to the ridge bracket.

2. The barrier as claimed in claim 1, wherein the shutters are mounted securely on the lower panels of the ridge bracket, and each shutter further comprises a crease formed longitudinally in the external surface near the proximal edge of the shutter.

3. The barrier as claimed in claim 2, wherein the holding device further comprises
   multiple hangers connected securely to the ridge bracket; and
   a cord mounted through the hangers and being parallel to the ridge bracket.

4. The barrier as claimed in claim 1, wherein the holding device further comprises
   multiple hangers connected securely to the ridge bracket; and
   a cord mounted through the hangers and being parallel to the ridge bracket.

5. The barrier as claimed in claim 4, wherein each hanger further comprises
   a top end;
   a bottom end; and
   at least one hook formed on the top end of the hanger; and the cord is mounted through the hooks of the hangers.

6. The barrier as claimed in claim 5, wherein each hanger further comprises an inserting recess formed in the bottom end of the hanger and mounted around the mounting edge of the ridge bracket.

7. The barrier as claimed in claim 4, wherein the ridge bracket is Y-shaped and each hanger is triangular.

8. The barrier as claimed in claim 1, wherein the ridge bracket is Y-shaped.

* * * * *